UNITED STATES PATENT OFFICE.

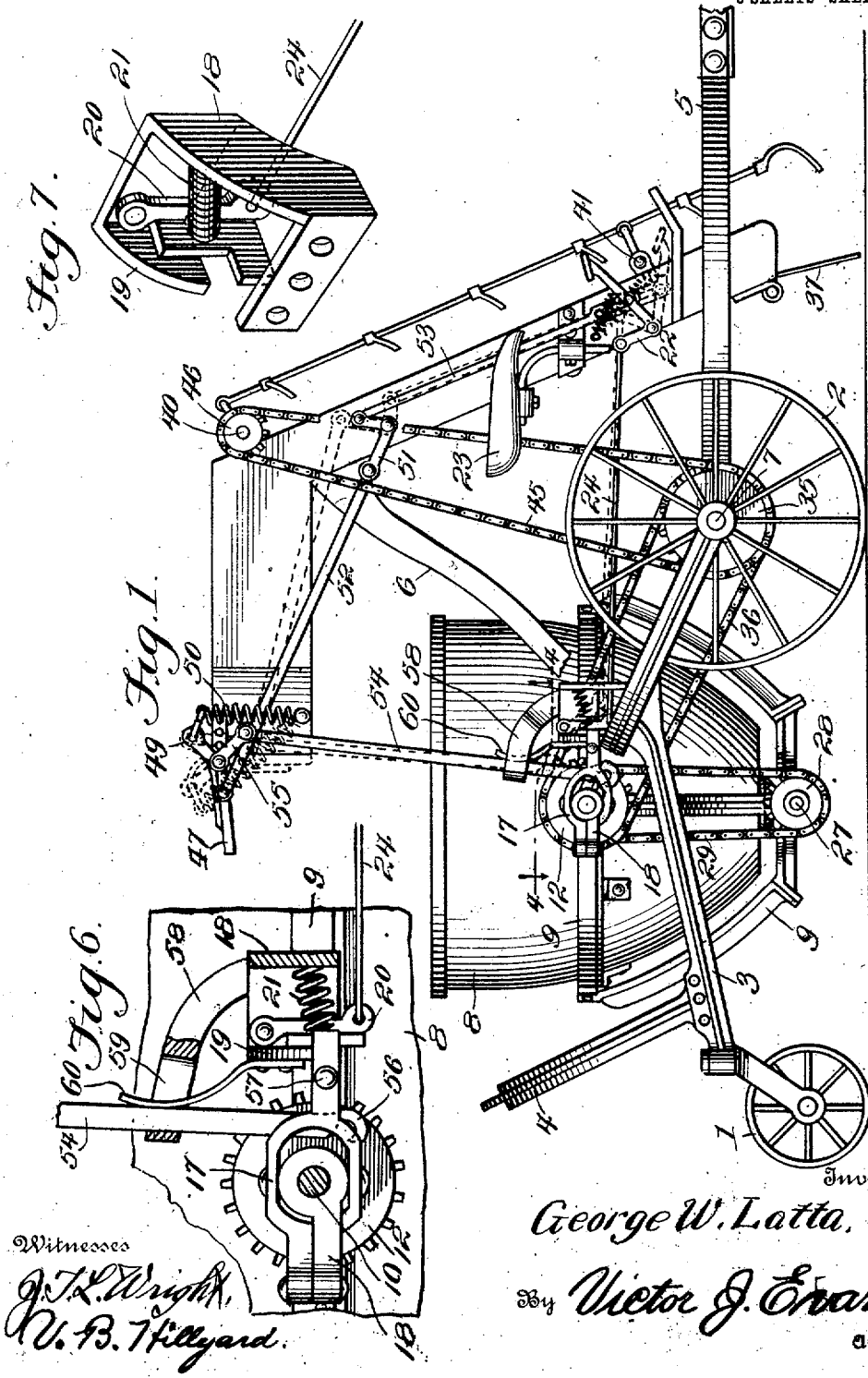

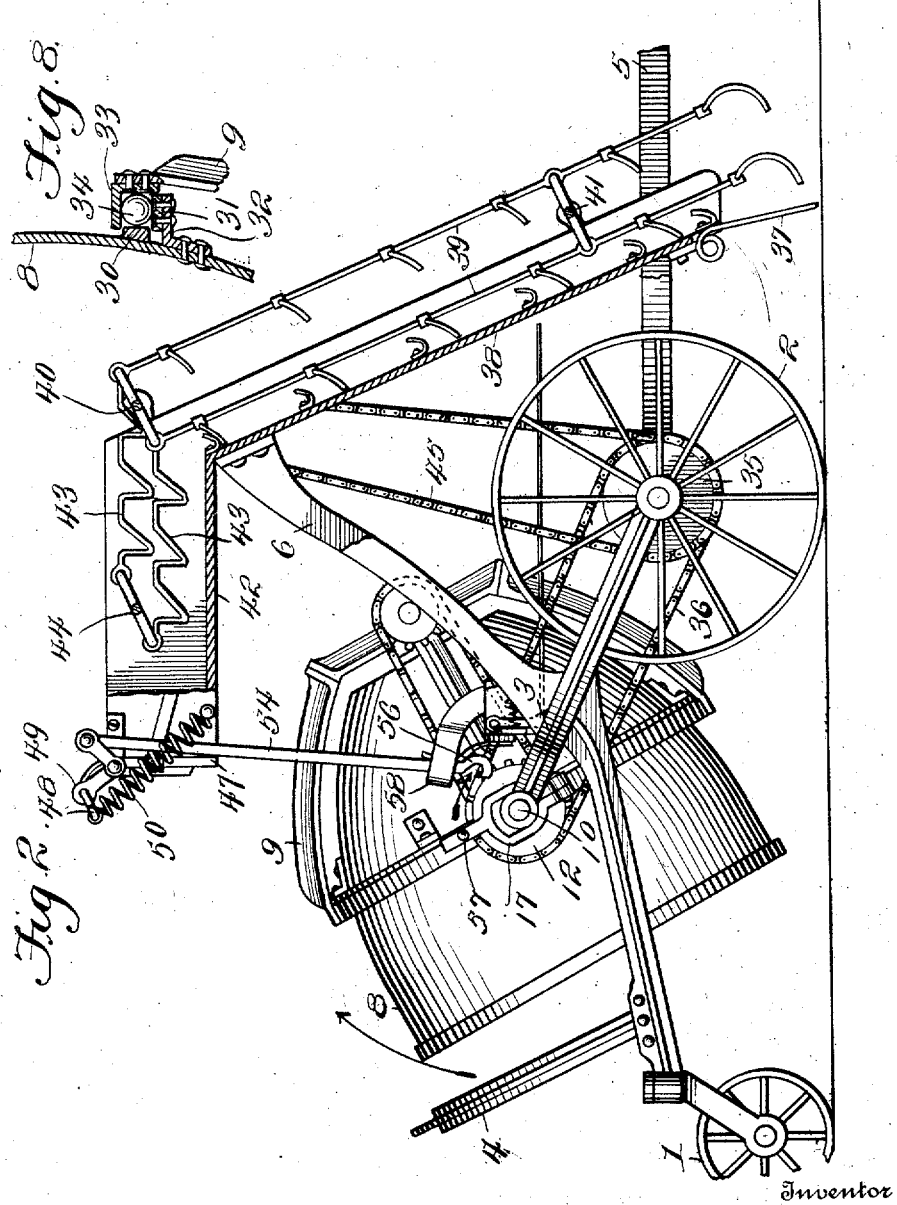

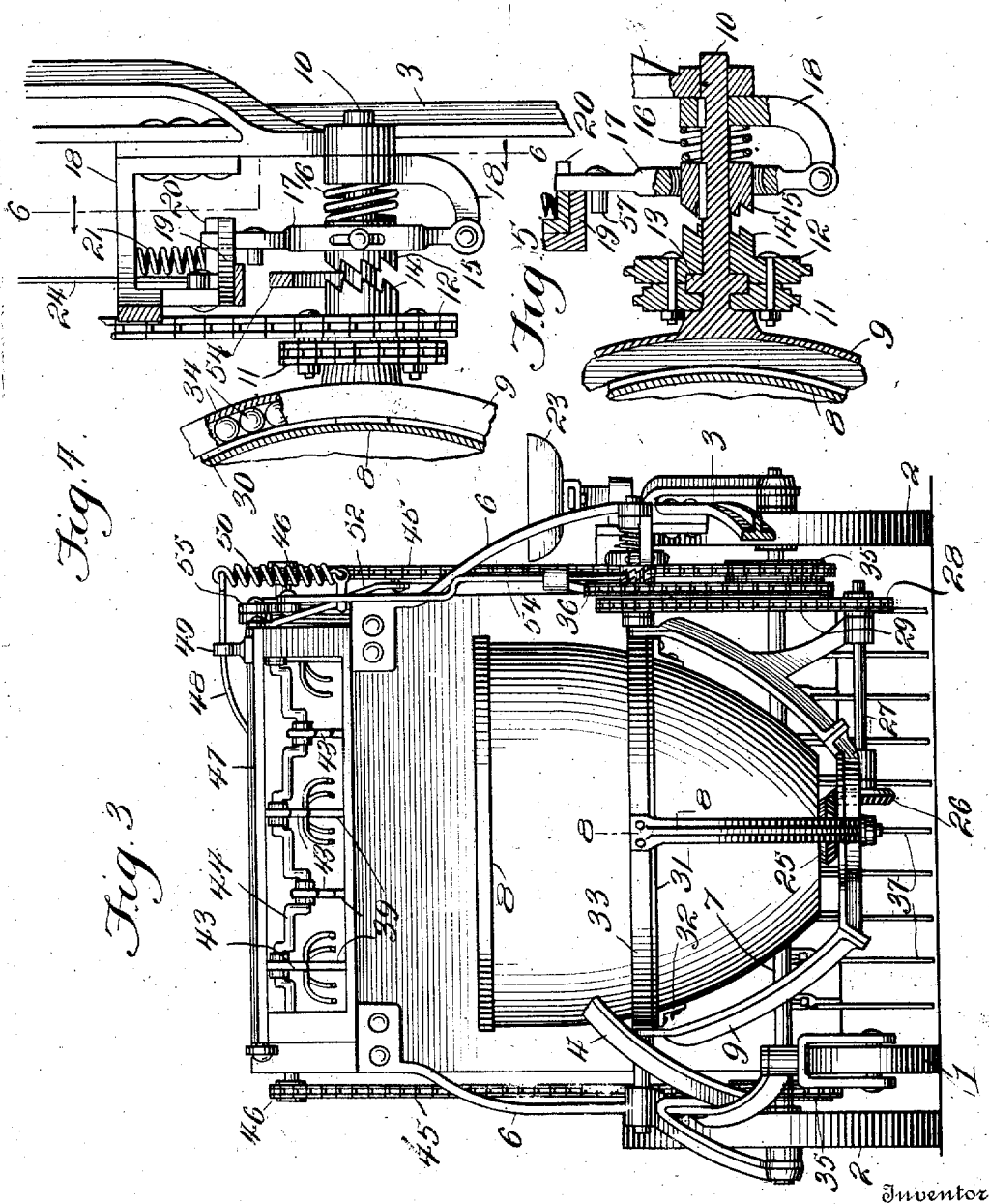

GEORGE WILLIAM LATTA, OF CORBYVILLE, ONTARIO, CANADA.

HAY-COCKING MACHINE.

964,280.  Specification of Letters Patent.  Patented July 12, 1910.

Application filed January 11, 1910. Serial No. 537,530.

*To all whom it may concern:*

Be it known that I, GEORGE WILLIAM LATTA, a citizen of Canada, residing at Corbyville, in the Province of Ontario and Dominion of Canada, have invented new and useful Improvements in Hay-Cocking Machines, of which the following is a specification.

The present invention provides a machine of novel formation for use in the field for gathering hay, straw, grain, and the like after being mown and forming the same into cocks and depositing the cocks at stated intervals to be subsequently gathered to be formed into a stack or for other purpose.

The invention aims chiefly to improve the hay cocking machine for which Letters-Patent of the United States were granted to Dorwin Wesley Valleau, June 11, 1901, No. 676,058, and is designed to provide novel means for operating the gate, whereby the discharge of the material from the carrier into the shock former or cocking receptacle is controlled with the result that when the shock former is thrown into gear to be actuated for depositing the shock upon the ground the gate is at the same time closed, thereby preventing discharge of the material and whereby when the shock former is about at the limit of its return movement after discharging the shock upon the ground the gate is automatically opened to admit of the material discharging from the carrier into the shock former.

A further purpose of the invention is to provide a carrier of peculiar formation and arrangement for positively urging the grain forward after the same has been picked up and elevated, said mechanism serving to pack or condense the fibrous material, so that it may pack to better advantage in the shock former.

The invention also aims to improve the mountings of the several parts and to devise a trip mechanism automatic in operation for effecting an opening of the gate by means of the shock former operating mechanism just prior to the return of the shock former to normal position.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a side view of a shock forming machine embodying the invention. Fig. 2 is a view similar to Fig. 1, showing the elevator and carrier in section and the position of the shock former on its return to normal position after having deposited a shock upon the ground. Fig. 3 is a rear view of the machine, a portion of the main frame being broken away. Fig. 4 is a detail horizontal section on the line 4—4 of Fig. 1, showing the parts on a larger scale. Fig. 5 is a sectional view of the same parts shown in Fig. 4, bringing out more clearly the structural details. Fig. 6 is a sectional detail on the line 6—6 of Fig. 4, looking to the left. Fig. 7 is a detail perspective view of the bracket provided with the cam and the dog pivoted thereto. Fig. 8 is a detail section of the shock former mounting on the line 8—8 of Fig. 3.

Corresponding and like parts are referred to in the following description, and indicated in all the views of the drawings, by the same reference characters.

The main frame is mounted upon a caster wheel 1 and ground wheels 2, the latter constituting drivers for operating the working parts. The main frame comprises side pieces 3, an arch 4 connecting the rear ends of the side pieces 3 and a draft frame 5, the latter having the team hitched thereto for propelling the machine over the ground. Arms 6 extend upwardly from the side pieces 3 and support the framework of the elevator and carrier. The drive wheels 2 are mounted upon the arms of the axle 7 so as to rotate the axle and the sprocket wheels fastened thereon and from which power is taken for driving the elevator and carrier and actuating the shock former and parts coöperating therewith.

The shock former 8 consists of a receptacle of approximately conical form and is mounted to receive both a rotary motion about a vertical axis and a turning about a horizontal axis, the latter resulting in discharging the shock after the same has been formed. A frame 9 supports the shock former or receptacle 8 and is mounted to turn about a horizontal axis, the shock former being mounted upon the frame 9 so as to turn thereon about a vertical axis. The frame 9 is provided at diametrically opposite points with trunnions 10, which are mounted in bearings of the main frame. A duplex sprocket wheel is loosely mounted upon one of the trunnions 10 and comprises the sprocket wheels 11 and 12, which are bolted or otherwise secured together with a collar 13 of the trunnion 10 confined between them, so as to prevent longitudinal movement of the duplex sprocket wheel upon the trunnion. It is to be understood in this connection that the duplex sprocket wheel may be formed in any manner and mounted upon the trunnion 10 so as to rotate freely thereon yet be prevented from moving longitudinally thereon. A clutch member 14 is provided upon the outer side of the duplex sprocket wheel and is adapted to coöperate with a clutch member 15 mounted upon the trunnion and secured thereto by means of a feather and spline connection, so as to turn therewith and yet be free to move longitudinally thereon. A helical spring 16 mounted upon the trunnion 10 normally exerts a pressure upon the clutch member 13 to force the same into engagement with the clutch member 14. A shipper lever 17 pivoted at one end to an arm 18 secured to the trunnion 10 has engagement with the movable clutch member 15 and is adapted to be held in restraint at its opposite end so as to hold the clutch members 14 and 15 separated, so that the duplex sprocket wheel may turn freely upon the trunnion 10.

A bracket 18 is secured to a side piece of the main frame and is provided with a cam 19, which extends across the path of the free end of the shipper lever 17 so as to move the same outward and compress the spring 16 and thereby effect disengagement of the clutch members 14 and 15. A dog 20 is pivoted to the bracket 18 adjacent the cam 19 and is pressed forward by means of a helical spring 21. The dog 20 serves to hold the free end of the shipper lever 17 pressed outward to keep the clutch members 14 and 15 separated. The outer end of the clutch lever is confined between projecting parts of the cam 19 and dog 20, so as to hold the shipper lever securely against rotary movement in either direction when it is required to keep the clutch members 14 and 15 separated. Upon withdrawal of the dog 20 from behind the shipper lever 17, the spring 16 comes into play and moves the clutch member 15 inward into engagement with the clutch member 14, with the result that the duplex sprocket wheel is keyed to the trunnion 10 and the frame 9 is caused to rotate, thereby inverting the shock former 8 and causing the shock contained therein to be deposited upon the ground. The dog 20 is connected to one arm of a bell crank 22 arranged within convenient distance of the driver's seat 23, so that at the proper time, that is when the receptacle 8 is filled, the operating mechanism may be thrown into gear to effect discharge of the shock in the manner stated.

The connection 24 between the dog 20 and bell crank 22 may consist of a rod or analogous part. The other member of the bell crank 22 constitutes a treadle upon which the driver exerts pressure by means of the foot. When the duplex sprocket wheel is secured to the trunnion 10, by means of the clutch, the frame 9 and shock former move forwardly and downwardly. The arm 18 being secured to the trunnion rotates therewith, hence the shipper lever 17 pivoted to the arm 18 and receiving the trunnion 10 and clutch member 15, which passes through an opening thereof, correspondingly rotates and when the shock former is approaching the limit of a complete revolution the free end of the shipper lever 17 engages the cam 19 and rides thereon, with the result that the outer end of the shipper lever is moved outward and carries the clutch member 15 therewith, the parts being so timed and proportioned that when the shock former is in normal position the clutch member 15 is completely disengaged from the clutch member 14 and its outer end is held secure between the projecting parts of the cam 19 and the dog 20.

The cock or shock former 8 is mounted upon the frame 9 so as to turn freely about a vertical axis and is provided at its lower end with a bevel gear 25, which meshes with a bevel gear 26 at the inner end of a horizontal shaft 27, the latter being provided at its outer end with a sprocket wheel 28, which is connected by a sprocket chain 29 with the sprocket wheel 11. By this means motion is transmitted from the duplex sprocket wheel to the shock former for rotating the latter about a vertical axis. The shock former is provided intermediate of its upper and lower ends with a band 30 and with a circular track 31, the latter being secured to the shock former at intervals by means of brackets 32. A circular track 33 of angle formation in transverse section is secured to upright members of the frame 9 and forms a part thereof. The space inclosed between the band 30 and tracks 31 and 33 forms a race in which balls 34 are placed and which coöperate with the inclosing walls of the race to retain the shock former in place and reduce the friction to the smallest amount possible.

Sprocket wheels 35 are secured to opposite end portions of the axle 7 so as to rotate therewith, one of the sprocket wheels being single and the other double. A sprocket chain 36 connects a member of the double sprocket wheel with the sprocket wheel 12, so as to drive the latter when the machine is in operation. It will thus be understood that as the machine is drawn over the field the shock former 8 is caused to rotate about a vertical axis by reason of the intermediate connections between the double sprocket wheel 35 and the shock former 8. When sufficient material has accumulated in the shock former to provide a shock of the desired dimensions the bell crank or foot lever 22 is operated, thereby throwing the clutch into engagement in the manner herein stated, with the result that the shock former carrying frame 9 is rotated and deposits the shock upon the ground.

A rake 37 is provided for gathering the hay or other loose material as the same has been left in the field by the harvester or mower. The material thus gathered is carried upward by means of an elevator or lifting means and is delivered to a carrier, which latter effects discharge thereof into the shock former 8. The elevator consists of a trough-shaped frame 38, inclined inwardly and rearwardly, and vibrating rakes 39, which are mounted upon crank portions of crank shafts 40 and 41. The vibrating rakes 39 operate alternately and serve to move the material upward through the trough-shaped frame 38 step by step. The carrier consists of a trough-shaped frame 42 and toothed bars 43, the latter being mounted upon crank portions of the shaft 40 and a crank shaft 44, the latter being mounted near the rear end of the frame 42. The crank shaft 40 is positively driven from the axle 7 by means of sprocket chains 45, which pass around the sprocket wheels 35 and other sprocket wheels 46 secured to opposite ends of the crank shaft 40. The carrier 42 is arranged in an approximately horizontal position, its rear end terminating above the shock former, so that the material discharging from the carrier drops directly into the shock former. A gate 47 closes the rear end of the carrier or frame 42 and is adapted to swing upward and rearward from its lower edge. During the formation of the shock the gate is open, as indicated by the full lines in Fig. 1, and when the shock former is turning with its supporting frame 9 to discharge the shock the gate 47 is closed, as indicated in Fig. 2, thereby retaining the material in the carrier and preventing waste thereof.

An arm 48 is secured at one end to the gate 47 and extends outwardly therefrom, passing through a bracket 49 secured to said gate. A spring 50 connects the outer end of the arm 48 with the carrier 42, the parts being so arranged that when the gate is closed the spring 50 exerts a force to hold said gate shut, and when the gate is open the spring exerts a pressure to retain said gate in its open position. This is plain on reference to Figs. 1 and 2 of the drawings. When the gate is closed the spring 50 occupies an inclined position and exerts a pulling force to force the gate against the frame or carrier 42 and when said gate is open the spring 50 occupies an approximately vertical position and exerts a pulling force to throw the gate upward, as indicated by the full lines in Fig. 1. The bracket 49 secured to the gate inclines upwardly and rearwardly when the gate is closed, as shown in Fig. 2, and inclines upwardly and forwardly when the gate is open, as indicated in Fig. 1. hence the relative position of the spring 50 changes under the varying conditions.

A bell crank 51 is mounted upon the upper portion of the elevator frame 38 and one member is connected by means of a rod or bar 52 with the gate 47 and its other member is connected by means of a bar or rod 53 with the bell crank or foot lever 22. At the same time that the bell crank or foot lever 22 is operated to withdraw the dog 20 from beneath the free end of the shipper lever 17, the bell crank 51 is operated to throw the gate 57 open. It will thus be understood that both operations are performed practically at the same time. A bar or rod 54 is connected at its upper end to an arm 55 secured to an extension of the axis or journal of the gate 47 and its lower end extends into the path of the shipper lever 17 and is provided with a hook 56 to be engaged by a pin 57 projected laterally from the free end of the shipper lever. A bracket arm 58 extends from the main frame and its upper end is provided with a slot 59, through which the bar or rod 54 passes. A spring 60 secured to the bracket 18 extends into the slot 59 and presses against the lower end of the bar or rod 54 to hold the same at the outer end of the slot 59 and in position to be engaged by the pin or projection 57 of the shipper lever. When the gate 47 is closed, as indicated by the dotted lines in Fig. 1 and by the full lines in Fig. 2, the bar or rod 54 is elevated, so that its hooked end 56 is in a position to be engaged by the pin or projection 57 of the shipper lever just prior to the return of the shock former 8 to normal position. The pin or projection 57 engages the hooked end 56 of the bar 54 a little in advance of engagement of the free end of the shipper lever with the cam 19, so that the arm 55 is drawn downward, thereby opening the gate 47 and at the same time moving the parts 49 and 48 until the upper end of the spring 50 passes by a line extending perpendicularly through the axis of the gate, when said spring, by reason of its tractile force, will throw the gate 47 open to its fullest extent. As the shipper lever 17 rides upon the cam 19 it is moved outwardly at its free end, thereby withdrawing the pin or projection 57 from engagement with the hooked end of the bar or rod 54, so as to clear the same a moment before the shipper lever passes the cam 19. It will thus be understood that the gate 47 is opened automatically and at the proper time, the gate opening means being thrown out of action at about the same time that the shock former assumes the given position.

In the practical operation of the invention the hay or other fibrous material is gathered by the rake 37 as the machine is drawn over the field and is lifted to the carrier 42 by means of the elevator and is discharged from said carrier and drops into the shock former, the latter being continuously rotated to insure an even distribution of the material therein. After the receptacle or shock former 8 has received sufficient material to form a shock the driver operates the bell crank or foot lever 22, thereby closing the gate 47 and at the same time throwing the mechanism into gear for rotating the shock former about a horizontal axis to effect a discharge of the shock upon the ground. During the operation of the shock former to effect discharge of the shock the gate 47 remains closed and as the shock former completes its revolution about its horizontal axis the shipper lever 17 comes in contact with the bar or rod 54 and with the cam 19, with the result that the gate 47 is thrown open and the operating mechanism for effecting discharge of the shock is thrown out of action.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In combination a cock former mounted to turn both about a vertical and a horizontal axis, operating means for rotating the cock former about the vertical axis, means for turning the cock former about the horizontal axis to effect a discharge of the cock, said means including a clutch, a shipper lever for operating said clutch, means normally exerting a pressure to throw the clutch into action, a dog engaging the shipper lever and holding the clutch out of action, means for supplying the material to the cock former, a gate, an operating lever having connection with both said gate and dog to open the gate and withdraw the dog from engagement with the shipper lever, and means having connection with the gate and extended into the path of the shipper lever to be operated thereby to effect an opening of the gate upon return of the cock former to normal position.

2. In combination a cock former mounted to turn about a vertical and a horizontal axis, operating means for rotating the cock former about the vertical axis, other means for turning the cock former about a horizontal axis to effect discharge of the cock, said means including a clutch, a shipper lever coöperating with the clutch, a dog engaging the shipper lever to hold the clutch separated, means for supplying material to the cock former, a gate for shutting off the supply during the discharging operation of the cock former, an operating lever having connection with the gate and dog, a bar having connection with the gate and extending within the path of the shipper lever to be engaged thereby to effect an opening of the gate as the cock former assumes a normal position after discharging the cock, and a cam for moving the shipper lever to simultaneously separate the members of the clutch and to disengage the shipper lever from the gate operating bar.

3. In combination, a cock former, a feeder for supplying material to the cock former, a gate for shutting off the feed, operating means for moving the cock former to effect discharge of the cock therefrom including a clutch, a shipper lever mounted to move with the cock former, a cam coöperating with the shipper lever to throw the clutch out of action, a dog engaging the shipper lever to hold the clutch out of action, a bar having connection with said gate and extending within the path of the shipper lever to be engaged thereby to effect an opening of the gate as the cock former assumes a given position after discharging the cock, an operating lever having connection with both the gate and said dog, and a spring coöperating with the gate and serving to carry the same past a dead point both in the opening and in the closing and serving to hold the gate either open or closed.

4. In combination a cock former, operating means therefor to effect a discharge of the cock including a clutch, a feeder for supplying material to the cock former, a gate for shutting off the feed, a spring connected with the gate and adapted to carry the same past a dead point both in the opening and in the closing and adapted to hold said gate either open or closed, a bar having connection with the gate, a shipper lever coöperating with the aforesaid clutch to throw the same out of action and adapted to engage the gate operating bar, and a cam for moving the shipper lever to both throw the clutch out of action and to disengage said shipper lever from the gate operating bar as the cock former assumes a given position after discharging the cock.

5. In combination a cock former, means for imparting a rotary movement to the cock former, a supporting frame, a circular track provided upon the cock former, a circular track carried by the cock former supporting frame, and balls confined in the space formed between the circular tracks.

6. In combination a cock former mounted to turn about a vertical axis, a band encircling the cock former, a horizontal track encircling the cock former and attached thereto, a supporting frame for the cock former, a circular track carried by the supporting frame and of L-form in cross section, a raceway being formed between said band and circular tracks, and balls confined in said raceway.

In testimony whereof I affix my signature in presence of two witnesses.

GEORGE WILLIAM LATTA.

Witnesses:
C. L. HAWLEY,
JAMES SHURIE.